(12) United States Patent
Chen

(10) Patent No.: US 7,410,147 B2
(45) Date of Patent: Aug. 12, 2008

(54) FAUCET VALVE STRUCTURE WITH TWO-WAY AUTOMATIC REPOSITIONING FUNCTION

(75) Inventor: Mei-Li Chen, Tanzih Township, Taichung County (TW)

(73) Assignee: Kuching International Ltd., Taichung County (TW)

( * ) Notice: Subject to any disclaimer, the term of this patent is extended or adjusted under 35 U.S.C. 154(b) by 263 days.

(21) Appl. No.: 11/455,265

(22) Filed: Jun. 19, 2006

(65) Prior Publication Data

US 2008/0001112 A1    Jan. 3, 2008

(51) Int. Cl.
*F16K 51/00* (2006.01)
(52) U.S. Cl. .................................. 251/285; 137/625.17
(58) Field of Classification Search .................. 251/284, 251/285, 286, 288; 137/625.17, 625.4
See application file for complete search history.

(56) References Cited

U.S. PATENT DOCUMENTS 4,078,763 A * 3/1978 Yamamoto ................... 251/96
5,048,792 A * 9/1991 Fischer ....................... 251/297
6,220,571 B1 * 4/2001 Kim et al. ................... 251/284
6,409,148 B1 * 6/2002 Dempsey et al. ............ 251/288

* cited by examiner

Primary Examiner—John K Fristoe, Jr.
(74) Attorney, Agent, or Firm—Egbert Law Offices

(57) ABSTRACT

The faucet valve structure of two way automatic repositioning function includes a base ring, resilient spring, activating ring, and linking component. The base ring has a protruding block placed thereon. The resilient spring is placed on the base ring, which includes a first and second effector. The activating ring is placed on the resilient spring, which includes a first support that corresponds to the protruding block and a second support that corresponds to the second effector. The linking component is placed on the top end of the rotary base, and it has a crosswise protruding extension. When the user is using the faucet, whether it is on hot water mode or cold water mode, the brake valve shaft can be repositioned to the middle position, so that when the user is turning on the water regardless of warm or cold, it ensures safety from a burn injury.

7 Claims, 8 Drawing Sheets

FAUCET VALVE STRUCTURE WITH TWO-WAY AUTOMATIC REPOSITIONING FUNCTION

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a faucet valve structure, and more particularly to a valve that can be repositioned to a middle section of the structure whether it is on hot water or cold water when the valve is to be turned off.

BACKGROUND OF THE INVENTION

The instructions for using the conventional bi-temperature water faucet is well-known among users. Users simply pull the grip up to turn the faucet on, then turn it right or left to adjust the water temperature. With this conventional structure, if the user turns off the water by pushing the grip down in hot water mode, then the grip will still be on the hot water mode. Therefore, the user may be in danger of a burn injury caused by the hot water when the user turns on the water the next time. This situation happens to very young and elderly users easily.

For these reasons, the industry has developed a single valve with an automatic repositioning structure. Its primary application is to place a repositioning device on the top end of the water valve. The repositioning device interacts with the valve, so that whether the water is in hot water mode or cold water mode, the valve can be repositioned by this device, making the faucet safe to use.

Thus, to overcome the aforementioned problems of the prior art, it would be an advancement in the art to provide an improved structure that can significantly improve efficacy.

To this end, the inventor has provided the present invention of practicability after deliberate design and evaluation based on years of experience in the production, development and design of related products.

BRIEF SUMMARY OF THE INVENTION

The present invention mainly comprises a unique structure of a base ring 50, resilient spring 60, activating ring 70, and the linking component 80. When the user is using the faucet, whether it is on hot water mode or cold water mode, the brake valve shaft of the water control valve A can be repositioned to the predetermined middle position by the operation of this structure. When the user is turning on the water regardless of warm or cold, it ensures safety from a burn injury, meeting the multiple demands of users.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

Figure 1:
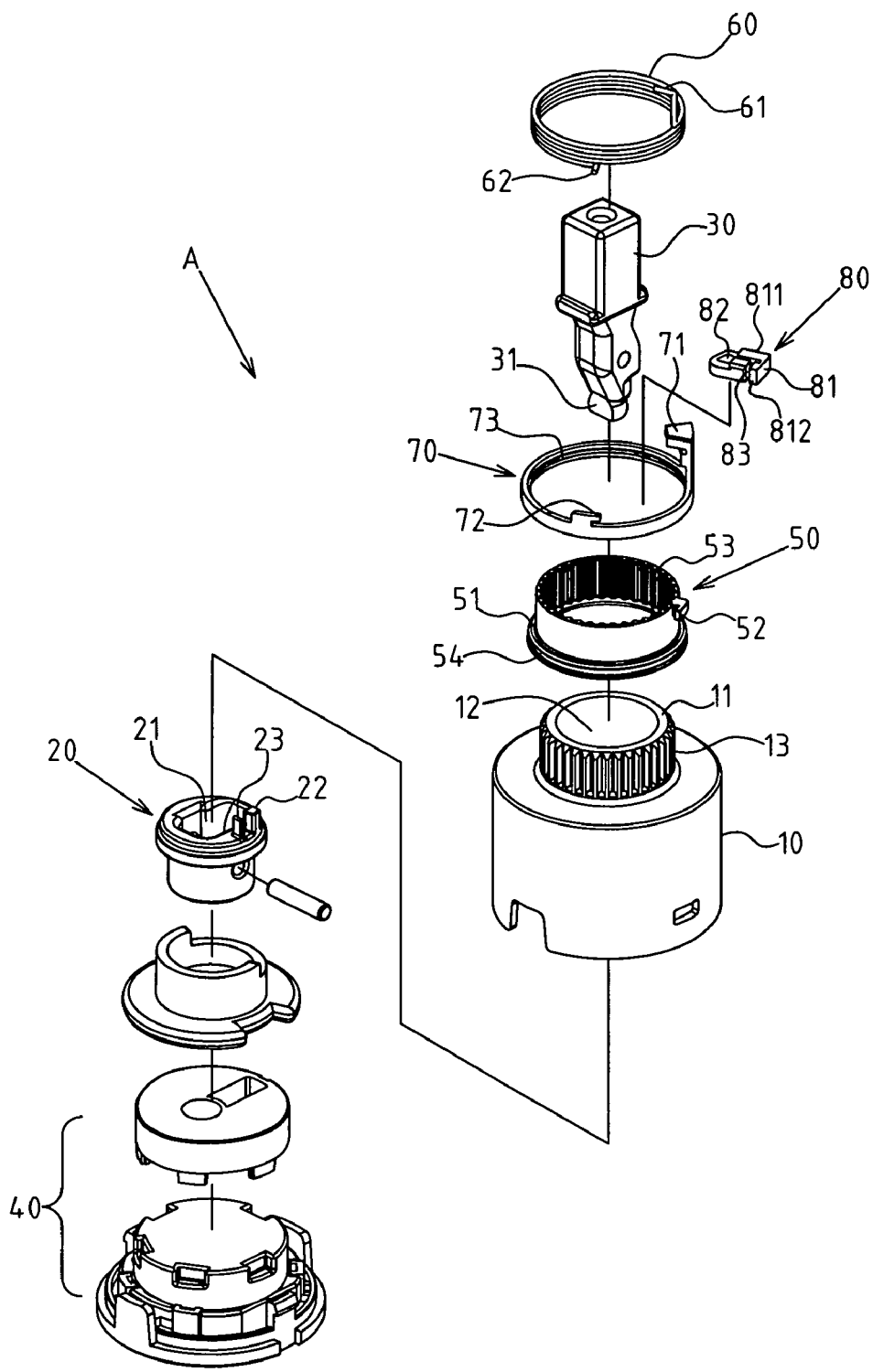
FIG. 1 shows an exploded perspective view of the primary components of the present invention.
Figure 2:
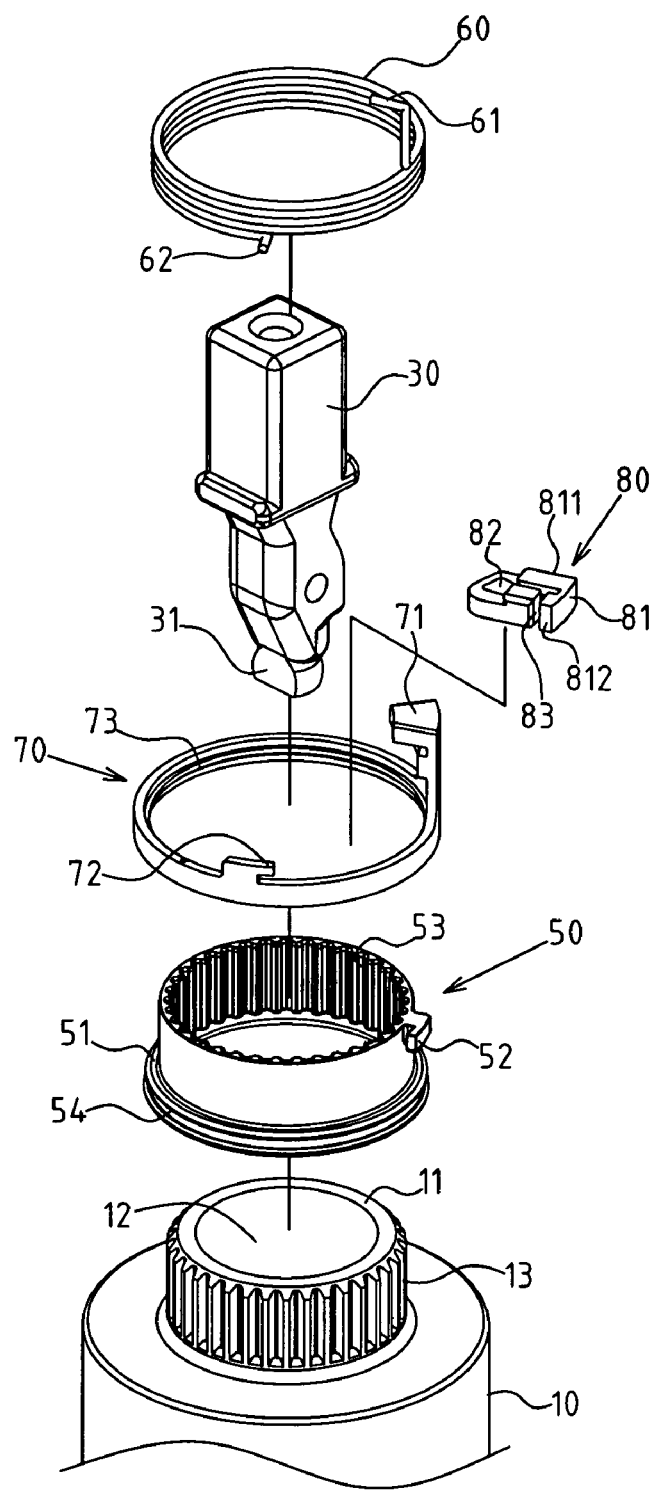
FIG. 2 shows an enlarged perspective view of the partial components shown in FIG. 1.
Figure 3:
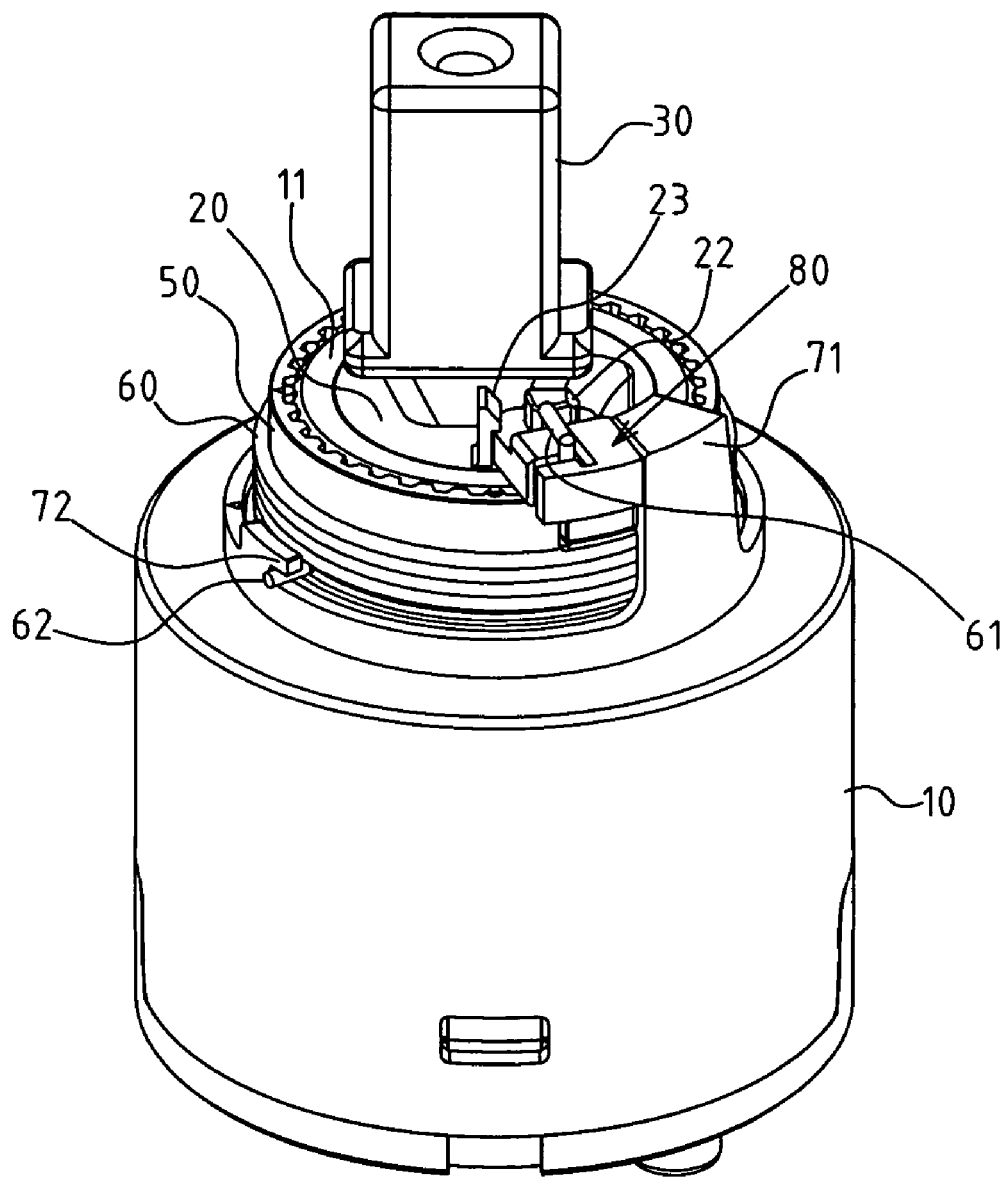
FIG. 3 shows an assembled perspective view of the present invention.
Figure 4:
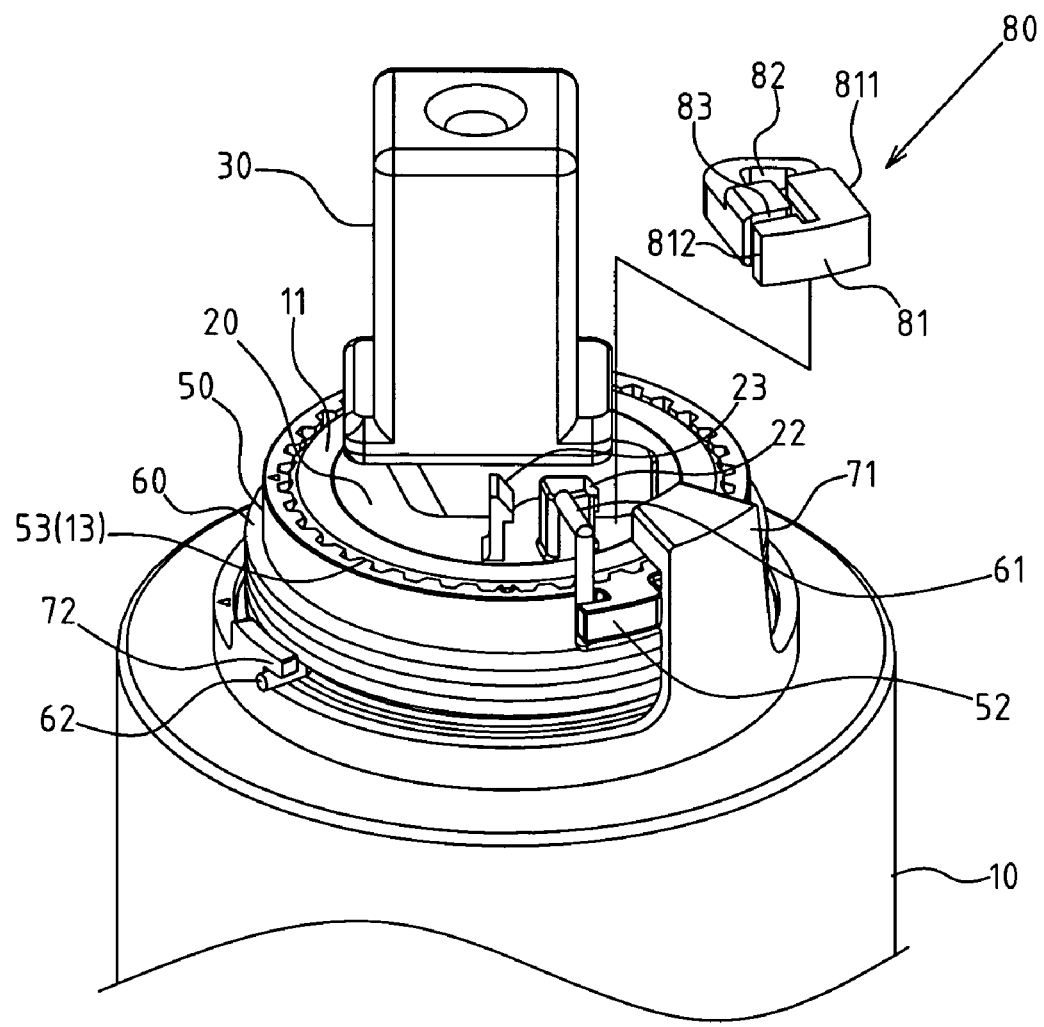
FIG. 4 shows an exploded perspective view of the linking component of the present invention.
Figure 5:
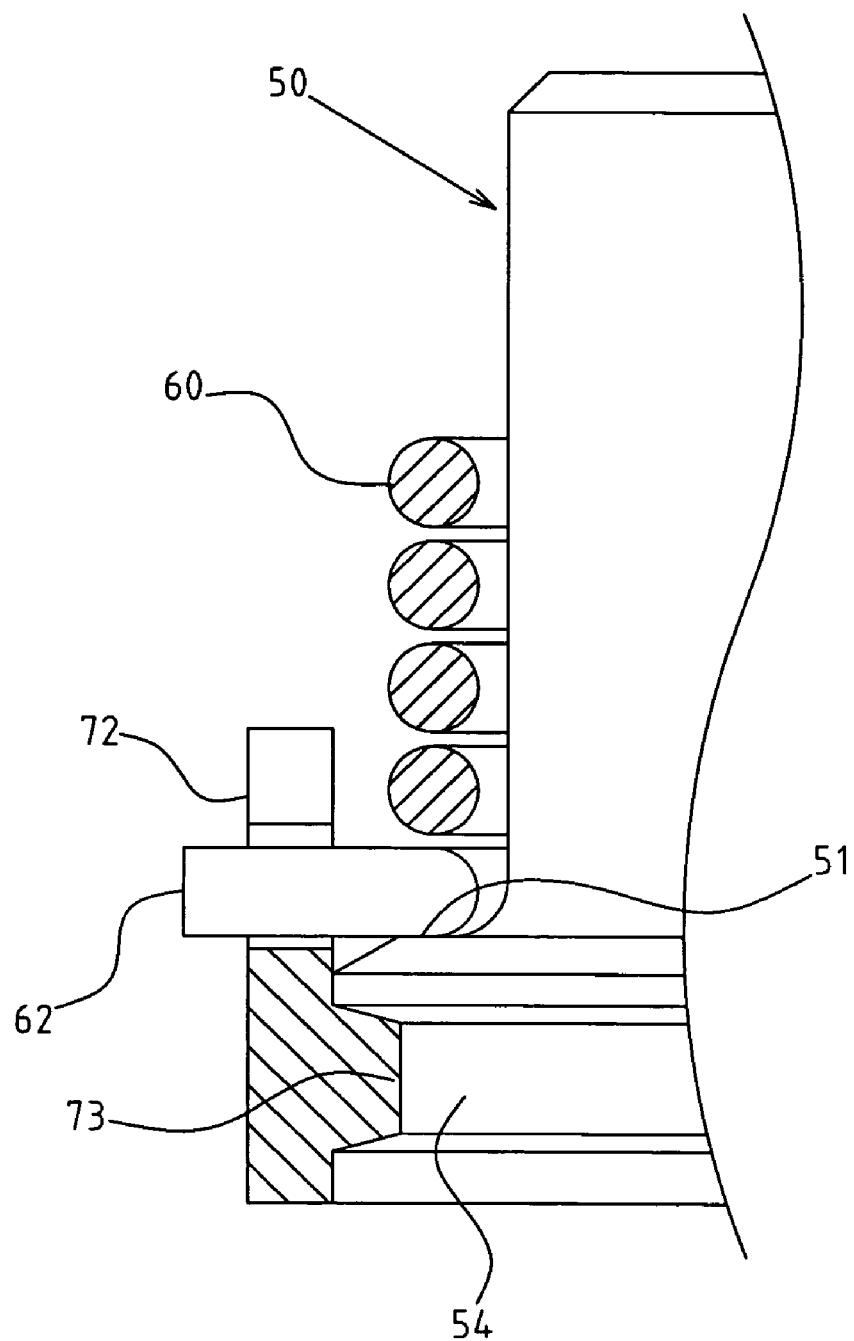
FIG. 5 shows a partial sectional view of the present invention.

The features and the advantages of the present invention will be more readily understood upon a thoughtful deliberation of the following detailed description of a preferred embodiment of the present invention with reference to the accompanying drawings.

As shown in FIGS. 1-5, the preferred embodiment of the faucet valve structure with two-way repositioning function is shown. This embodiment is used for descriptive purposes only, and it is not intended to limit the scope of the invention as defined by the claims.

The faucet valve A comprises a housing 10, and a protruding tube 11 is placed on the top of the housing. An opening 12 is made on the protruding tube 11, and a rotary base 20 is placed inside the opening. Another opening 21 is made on the rotary base 20 for a brake valve shaft 30, and the bottom 31 of the brake valve shaft 30 interacts with the water control unit 40 inside the housing 10. The interaction between the brake valve shaft 30 and the water control unit 40 is known as the conventional structure; therefore, it is not described herein.

The present invention includes a base ring 50, which is placed on the protruding tube 11 of the housing. A limiting edge 51 is placed on the bottom of the base ring 50, and a protruding block 52 is placed on the top of the base ring 50.

A resilient spring 60 is placed on top of the limiting edge 51 of the base ring 50, and the resilient spring 60 comprises a first effector 61 that is located on its top. A second effector 62 is located on bottom of the resilient spring 60.

An activating ring 70 is placed on the outside of the resilient spring 60 and can be rotated. The activating ring 70 includes a first support 71 and can be pushed against a protruding block 52 on one side of the base ring 5. Moreover, it includes a second support 72 that is to be pushed against the second effector at the bottom of the resilient spring 60.

Linking component 80 is placed on the predetermined part on the top end of the rotary base 20, and a crosswise protruding extension 81 is placed on the linking component 80. The first side 811 of the crosswise protruding extension 81 corresponds to the first support 71 of the activating ring, and the second side 812 of the crosswise protruding extension 81 corresponds to the first effector 61 at the top of the resilient spring 60.

The internal surface of the base ring 50 corresponds to the external surface of the protruding tube 11 of the housing 10 through the gears 53, 13 to keep the base ring 50 from displacing.

The limiting edge 51 at the bottom of the base ring 50 can be a ring-shaped protruding ring, and the protruding block 52 at the top of the base ring can be an L-shaped protruding column.

The first effector 61 at the top of the resilient spring 60 can protrude upward and curve inward. The second effector 62 at the bottom can curve outward.

The linking component 80 can be a single block, and a slip hole 82 is placed on one end. A protruding column 22 is placed on the top end of the rotary base 20 for the slip hole 82 to connect, and a hooked column 23 is placed on the top end of the rotary base 20 to be connected to one side of the linking component 80 to achieve the fixed position.

An annular protruding strip 73 and an annular groove 54 are placed between the activating ring 70 and the base ring 50 so that they are connected in a ring shape, and, by so doing, achieve a stable movement through the activating ring 70.

Through the above structure, the operation of the present invention is explained as follows herein.

Figure 6:
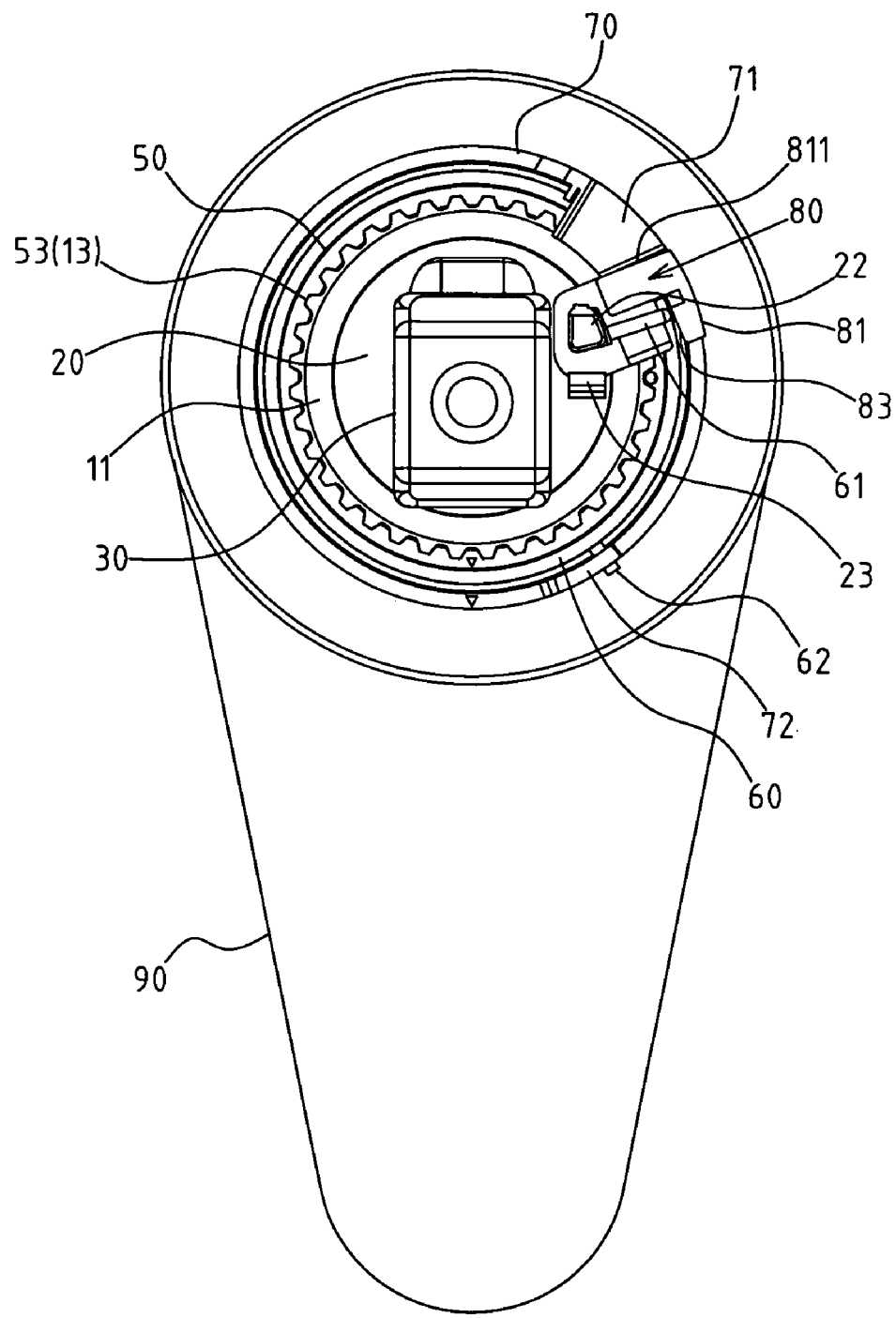
FIG. 6 shows the cross-sectional view of a first operation of the present invention.

As shown in FIG. 6, the water control valve A of the present invention and the operation of the faucet grip 90 is shown. Under this first circumstance, the resilient spring 60 is in a normal released state, and the first effector and the second effector 62 are not being pressed. The brake valve shaft 30 moves the faucet grip 90 to the middle section, and the middle section is for warm water. It is possible that the volume of the hot water is not enough to initiate the hot water heater so that it is still cold; therefore, it is referred to as "the middle section" herein.

Figure 7:
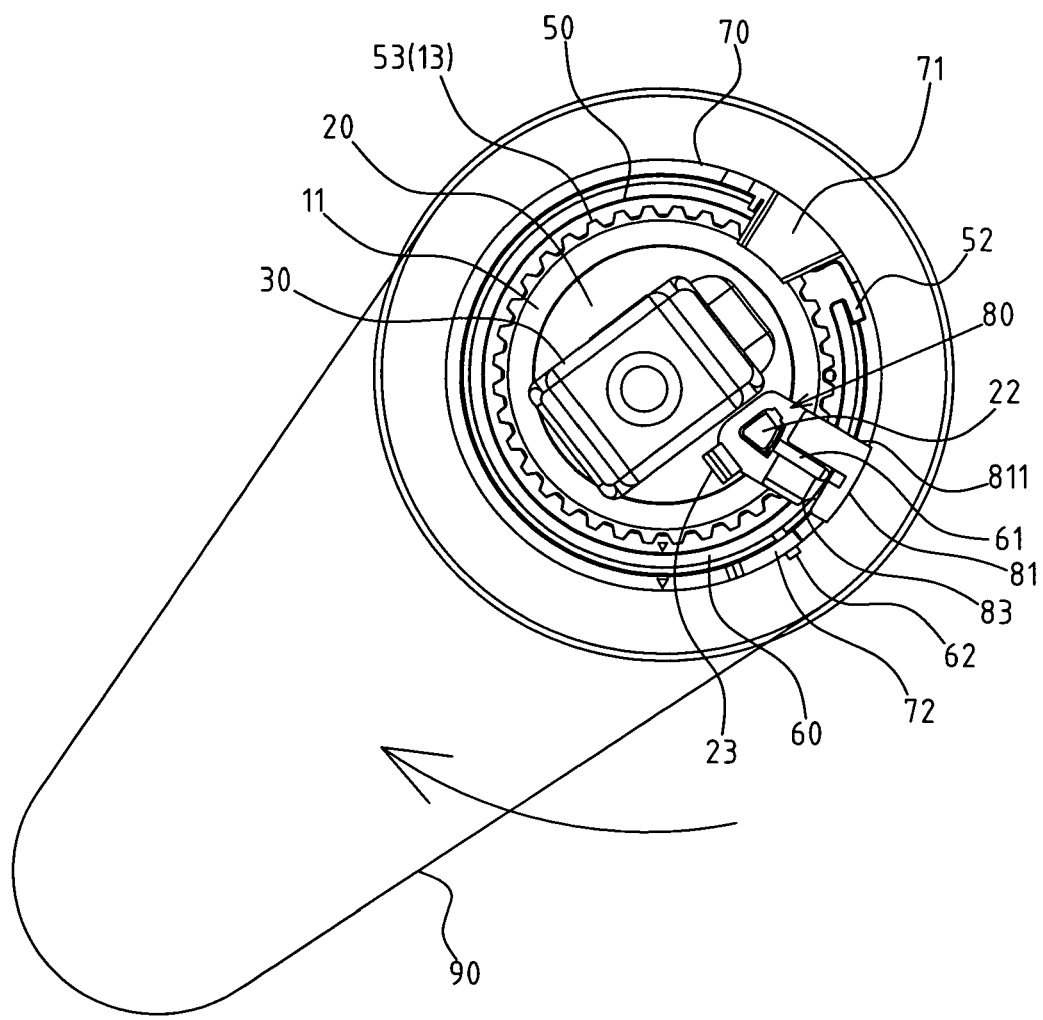
FIG. 7 shows the cross-sectional view of a second operation of the present invention.

As shown in FIG. 7, the water control valve of the present invention and the operation of the faucet grip 90 is shown under a second circumstance. When the user turns the faucet grip 90 clockwise to the hot water mode, the brake valve shaft 30 moves the rotary base 20 along with the linking component 80. Because the first support 71 of the activating ring 70 is blocked by the protruding block 52 of the base ring 50, the position of the second effector 62 of the resilient spring 60 is fixed as well. For these reasons, when the linking component 80 is turning, it may be tightened by the first effector 61 of the resilient spring 60 through its slot 83 of the crosswise protruding extension 81 and accumulate the restoring force. When the faucet grip 9 is turned off, the brake valve shaft 30 is automatically pulled back to the middle section by the restoring force of the resilient spring 60, as shown in FIG. 6.

Figure 8:
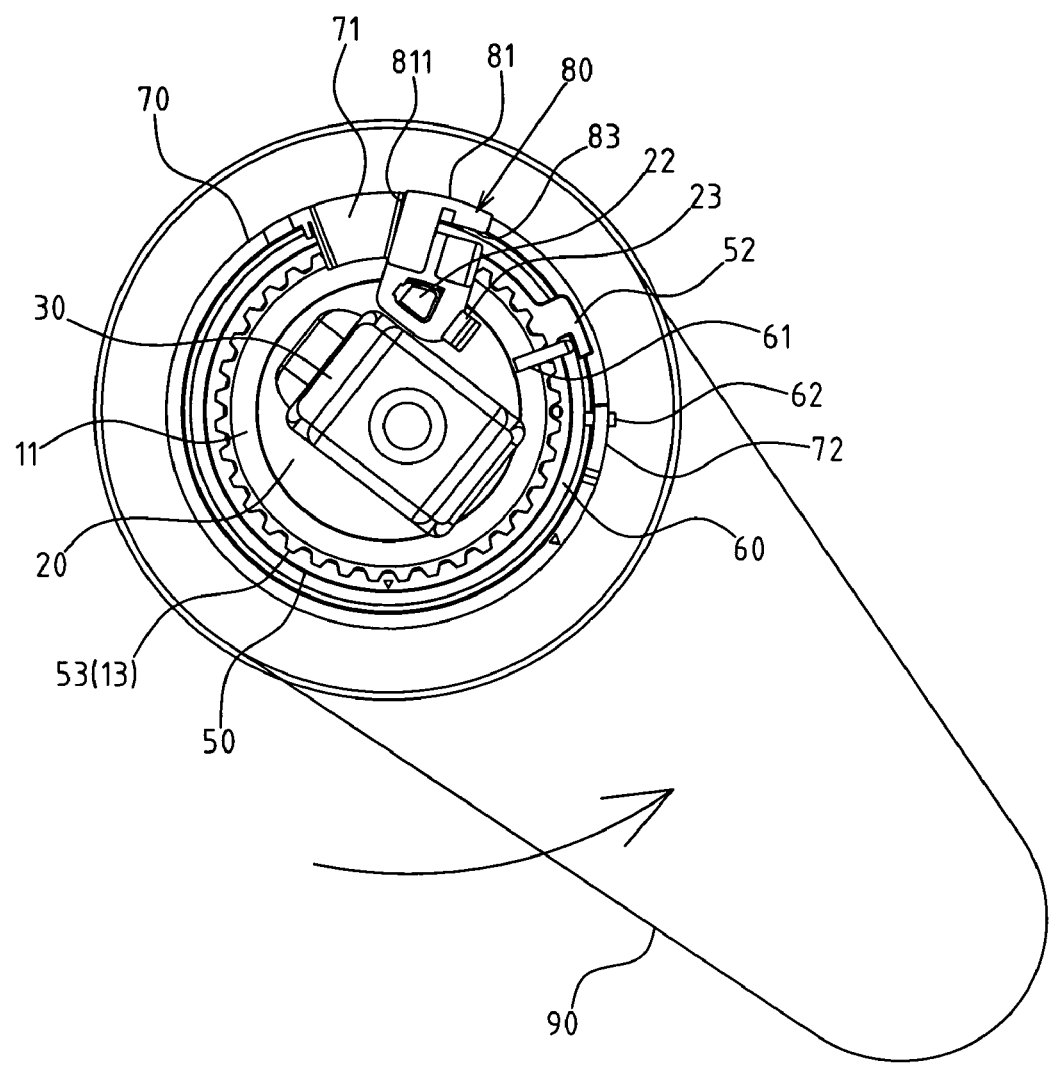
FIG. 8 shows the cross-sectional view of a third operation of the present invention.

As shown in FIG. 8, the water control valve of the present invention and the operation of the faucet grip 90 is shown under a third circumstance. When the user turns the faucet grip 90 counterclockwise to the cold water mode, the brake valve shaft 30 moves the rotary base 20 along with the linking component 80. When it is turned, the resilient spring 60 is blocked by the protruding block 52 of the base ring 50, the slot 83 of the cross wise protruding extension is made to come off the first effector 61 of the resilient spring 60. The linking component 80 is turned constantly through the first side 811, pushing the first support 71 to make the activating ring 70 turn counter clockwise. The second support 72 pushing the second effector 62 towards tightening direction is made to accumulate restoring force. When the faucet grip 90 is turned off, the brake valve shaft 30 is pulled back to the middle section through the restoring force of the resilient spring 60, as shown in FIG. 6.

In addition, the brake valve shaft 30 of the present invention uses the feature of the resilient spring 60. Only working when the brake valve shaft 30 is in a vertical angle (which is also when the water is turned off), and when the brake valve shaft 30 is in an oblique angle (which is also when the water is turned on), the internal water control unit 40 makes the brake valve shaft 30 receive the fraction that is larger than the restoring force of the resilient spring 60. Thus, the position of the brake valve shaft 30 can be fixed at the angle adjusted by the user. This part of the structure is known as part of the conventional structure; therefore, it is not repeated herein.

I claim:

1. A faucet valve structure with two-way automatic repositioning function, said faucet valve being comprised of a housing, and a protruding tube, said protruding tube being placed on a top of said housing and having a tube opening made thereon, said tube opening having a rotary base placed therein, said rotary base having a base opening made thereon, said base opening engaging a brake valve shaft, said housing having a water control unit interactive with a bottom of said brake valve shaft therein, said faucet valve structure comprising:

a base ring, being placed on an outside of said protruding tube and having a limiting edge placed on a bottom of said base ring, said base ring having a protruding block placed on a top thereof;

a resilient spring, being placed on a top of said limiting edge of said base ring, said resilient spring being comprised of a first effector located on top of said resilient spring, and a second effector located on a bottom of said resilient spring;

an activating ring, being placed on an outside of said resilient spring and being rotatable, said activating ring being comprised of a first support pushable against one side of said protruding block of base ring, and a second support pushable against said second effector on said bottom of said resilient spring; and a linking component, being placed on a predetermined part on a top end of said rotary base and having a crosswise protruding extension placed thereon, said crosswise protruding extension having a first side thereof corresponding to said first support of said activating ring and a second side thereof corresponding to said first effector at said top of said resilient spring.

2. The structure defined in claim 1, wherein said base ring corresponds to said protruding tube of said housing, said base ring and said protruding tube being in locking engagement.

3. The structure defined in claim 1, wherein said limiting edge at said bottom of said base ring is comprised of a ring-shaped protruding ring, said protruding block at said top of said base ring being an L-shaped protruding column.

4. The structure defined in claim 1, wherein said first effector at said top of said resilient spring protrudes upward and curves inward, said second effector at said bottom curving outward.

5. The structure defined in claim 1, wherein said linking component is comprised of a single block, and a slip hole placed on one end of said single block, said rotary base having a protruding column placed on a top end thereof, said protruding column connecting said slip hole, and a hooked column placed on said top end thereof, said hooked column connecting to one side of said linking component, achieving a fixed position.

6. The structure defined in claim 1, wherein said second side of said crosswise protruding extension has a slot placed thereon, said slot connecting said first effector of said resilient spring.

7. The structure defined in claim 1, further comprising:

an annular protruding strip; and an annular groove, said annular protruding strip and said annular groove being placed between said activating ring and said base ring and being connected in a ring shape, achieving a stable movement through said activating ring.

* * * * *